(12) United States Patent
Van De Poel et al.

(10) Patent No.: US 12,357,930 B2
(45) Date of Patent: *Jul. 15, 2025

(54) LIQUID FILTER ASSEMBLY

(71) Applicant: Donaldson Company, Inc., Minneapolis, MN (US)

(72) Inventors: Gunter Van De Poel, Minneapolis, MN (US); Lukasz Handzlik, Minneapolis, MN (US); Joost Roels, Minneapolis, MN (US); Erwin Verbelen, Minneapolis, MN (US); Luca Ghisu, Minneapolis, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 182 days.

This patent is subject to a terminal disclaimer.

(21) Appl. No.: 17/325,424

(22) Filed: May 20, 2021

(65) Prior Publication Data

US 2021/0268411 A1 Sep. 2, 2021

Related U.S. Application Data

(63) Continuation of application No. 16/331,887, filed as application No. PCT/US2017/051618 on Sep. 14, 2017, now Pat. No. 11,045,754.

(Continued)

(51) Int. Cl.
*B01D 35/16* (2006.01)
*B01D 29/33* (2006.01)
(Continued)

(52) U.S. Cl.
CPC ............ *B01D 35/16* (2013.01); *B01D 29/33* (2013.01); *B01D 35/153* (2013.01); *B01D 35/30* (2013.01);
(Continued)

(58) Field of Classification Search
CPC ............. B01D 35/16; B01D 2201/316; B01D 2201/347; B01D 2201/4076; B01D 2201/4061; B01D 2201/4046
(Continued)

(56) References Cited

U.S. PATENT DOCUMENTS 11,045,754 B2 * 6/2021 Ghisu ................... B01D 35/16
2002/0100720 A1 8/2002 Jainek
(Continued)

FOREIGN PATENT DOCUMENTS

DE 3538589 A1 5/1987
DE 102013202446 A1 8/2014
(Continued)

OTHER PUBLICATIONS

International Search Report and Written Opinion for PCT/US2017/051618, mailed Dec. 15, 2017.

*Primary Examiner* — Benjamin M Kurtz
(74) *Attorney, Agent, or Firm* — Merchant & Gould P.C.

(57) ABSTRACT

The disclosure pertains to a filter assembly comprising a base, a cover, and a cylindrical filter element, the base being adapted to receive the cover with the filter element inserted therein. The base has an outlet orifice with a first sealing zone, and a drainage orifice with a second sealing zone. The filter element comprises an outlet tube with a first sealing element, and a drainage plug with a second sealing element, said outlet tube and said drainage plug being positioned to sealingly engage with said first sealing zone and said second sealing zone, respectively, when the base receives the cover. An axial distance (A) between the first sealing element and the second sealing element is different from an axial distance (B) between an end of the first sealing zone and an end of (Continued)

the second sealing zone facing the filter element. The present disclosure also pertains to a filter element for use in such a filter assembly.

16 Claims, 12 Drawing Sheets

Related U.S. Application Data

(60) Provisional application No. 62/394,363, filed on Sep. 14, 2016.

(51) Int. Cl.
 *B01D 35/153* (2006.01)
 *B01D 35/30* (2006.01)

(52) U.S. Cl.
 CPC .. *B01D 2201/316* (2013.01); *B01D 2201/347* (2013.01); *B01D 2201/4023* (2013.01); *B01D 2201/4046* (2013.01); *B01D 2201/4076* (2013.01); *B01D 2201/4092* (2013.01)

(58) Field of Classification Search
 USPC ......................................................... 210/248
 See application file for complete search history.

(56) References Cited

U.S. PATENT DOCUMENTS

| 2004/0211720 | A1* | 10/2004 | Mack | B01D 35/16 |
| | | | | 210/416.4 |
| 2008/0047900 | A1 | 2/2008 | Reamsnyder et al. | |
| 2009/0301950 | A1 | 12/2009 | Weindorf | |
| 2012/0018359 | A1* | 1/2012 | Sann | B01D 35/0276 |
| | | | | 210/232 |
| 2012/0205300 | A1 | 8/2012 | Piva et al. | |
| 2012/0261326 | A1 | 10/2012 | Deschamps et al. | |
| 2014/0027366 | A1* | 1/2014 | Hawkins | B01D 29/13 |
| | | | | 137/15.01 |
| 2015/0014239 | A1* | 1/2015 | Jokschas | B01D 29/15 |
| | | | | 210/450 |

FOREIGN PATENT DOCUMENTS

| EP | 2578821 | A1 | 4/2013 |
| EP | 3151944 | A2 | 4/2017 |
| WO | 2014191476 | A1 | 12/2014 |
| WO | 2015092523 | A1 | 6/2015 |

* cited by examiner

LIQUID FILTER ASSEMBLY

This application is a continuation of U.S. patent application Ser. No. 16/331,887, filed Mar. 8, 2019, which is a U.S. National Stage application of PCT International Patent Application No. PCT/US2017/051618, filed Sep. 14, 2017, which claims the benefit of priority to U.S. Provisional patent application Ser. No. 62/394,363, filed Sep. 14, 2016, which applications are incorporated herein by reference. To the extent appropriate, a claim of priority is made to each of the above disclosed applications.

FIELD OF THE INVENTION

The present invention pertains to the field of liquid filter assemblies, in particular lubricant or fuel filter assemblies that contain a filter element for filtering lubricant or fuel used by a hydraulic or mechanical equipment or an engine such as a vehicular internal combustion engine.

BACKGROUND

Liquid filter assemblies generally comprise a part that is fixed to the motor vehicle or motorized equipment for which they provide the lubricant filtering function, and a cover that may be separated therefrom to access and replace the filter element. The filter element is periodically removed for servicing, for example when it becomes sufficiently occluded to generate an undesirable level of restriction across the filter media, or when a service filter interval has passed. Servicing typically involves one of: replacing with a new filter element; replacing with a previously used, but refurbished, filter element; or, in some manner cleaning the removed element and replacing it for further use.

It is known to provide features that help ensure proper alignment and interaction between the element and a remainder of the system, to ensure that the element is properly positioned for use when it is installed; or to avoid that the wrong type of element is installed. Typically, the element is removably attached to the filter module's cover, such that by placing the cover on the base, the filter element is correctly positioned; and by removing the cover from its base, the filter element is removed at the same time. Depending on the design constraints of the vehicle or equipment, the module may be placed in such a way that the cover is attached to the top of the module or to its bottom.

DE 10 2013 202 446 A1 discloses a filter assembly for hydraulic fluids, in particular an oil filter assembly, with a separable, substantially cylindrical housing, which comprises a bowl-like lower part and a cover part that can be attached to it, and with a ring-shaped filter element comprising circular end discs that are connected with the ring-shaped edges of the filter surface. The filter element can be axially arranged into the lower part.

In modules with a top-mounted cover, such as the module of DE 10 2013 202 446 A1, the inlet and the outlet are necessarily situated in the lower part of the filter module, which constitutes the base. When the cover and the element are removed, they are lifted up above the level of the inlet and the outlet, and there is a risk that used lubricant leaking out of the cartridge contaminates the clean side (outlet side) of the module, or is spilled or over the equipment, the floor, or the operator. To reduce this risk, known systems have been provided with a drainage channel that allows draining the element prior to its removal, and a standpipe that physically isolates the outlet of the element from the lower portion of the element where leakage may occur. A drainage orifice in the base of the module is plugged by an eccentrically placed axial protrusion on the lower end disc of the filter element when the filter element is in place, and unplugged when the filter element is removed.

The inventors have found that despite these measures, the aforementioned contamination and spilling still occur to a certain extent. It is therefore an object of embodiments of the present invention to provide an alternative filter assembly design that avoids the risk of contamination and spilling upon removal of the cover of a top-mounted oil filter module.

SUMMARY OF THE INVENTION

According to an aspect of the present invention, there is provided a filter assembly comprising a base, a cover, and a substantially cylindrical filter element, the base being adapted to releasably receive the cover with the filter element at least partially inserted therein; the base having an outlet orifice with a first sealing zone, and a drainage orifice with a second sealing zone, the outlet orifice and the drainage orifice being concentric; the filter element comprising an outlet tube with a first sealing element, and a drainage plug with a second sealing element, the outlet tube and the drainage plug being concentric and positioned to sealingly engage with the first sealing zone and the second sealing zone, respectively, when the base receives the cover; wherein an axial distance between the first sealing element and the second sealing element is different from an axial distance between an end of the first sealing zone facing the filter element and an end of the second sealing zone facing the filter element.

The present invention is based inter alia on the insight of the inventors that by providing a drainage orifice that is concentric with the outlet orifice, the correct operation of the assembly is not affected by angular misalignment of the filter element relative to the base. The concentrically arranged drainage orifice may also provide a larger effective area than the typical eccentric prior art.

The present invention is further based on the insight of the inventors that by having a distance between the sealing elements on the filter element, that is different from, for instance smaller than, the distance between the point of entrance/exit of the respective sealing zones with which they engage, the respective seals of the drainage orifice and the outlet orifice engage at different times when the filter element is inserted into the base, and disengage at different times when the filter element is removed from the base. Thus, when the assembly is being serviced, the liquid in the filter element can be allowed to drain away from the base while the outlet orifice is still sealed. This feature contributes to avoiding contamination between the used (unfiltered) liquid and the outlet (clean) side of the assembly.

It is a further advantage of the present invention that as a result of the different arrangement of the orifices, a larger drainage orifice can be provided, such that the required drainage time can be reduced. In filter assemblies for heavy-duty equipment, the volume to be drained is relatively large (compared to the typical volumes in filter assemblies for traditional automotive applications), so the drainage rate is important to limit the overall duration of the filter servicing.

In an embodiment of the filter assembly according to the present invention, the base is adapted to receive the cover by rotational engagement of corresponding threaded surfaces on the base and the cover; and the base and the filter element comprise cooperating means to guide and maintain the filter element in a predetermined angular orientation when the cover is received by the base.

As the filter element is releasably attached to the cover, e.g. by means of a snap-fit mechanism or a mechanism based on latches, as for instance described in EP 3 151 944 in the name of the present applicant, when the cover is screwed onto the base, it will tend to rotate along with the cover to some degree during the screwing movement, even though it has a rotational degree of freedom relative to the cover. While the outlet and drainage orifices are concentric and not sensitive to being in a specific angular orientation, other functions of the filter assembly may require a particular angular orientation of the filter element. It is an advantage of this embodiment that the desired angular orientation of the filter element can be reached and maintained during the screwing-on of the cover.

In a particular embodiment of the filter assembly, the cooperating means comprise a protrusion on the filter element and a catching surface on the base, the catching surface being configured to impede clockwise rotation of the filter element by blocking the protrusion when the filter element is screwed onto the base to a level where the catching surface lies in a path of the protrusion, the catching surface being formed as an upright edge of a circumferential ridge or ramp that slopes downwards in the clockwise direction at a pitch which exceeds a pitch of the threaded surfaces.

It is an advantage of this embodiment that the desired angular orientation of the filter element can be reached and maintained during the screwing-on of the cover, without risking that the rotation inhibiting means impedes the installation of the filter element.

In a more particular embodiment, the drainage plug comprises a surface shaped as a cylindrical mantle, and the protrusion is formed as an axial rib, radially protruding from the cylindrical mantle, oriented along a direction parallel to the filter element's longitudinal axis.

It is an advantage of this embodiment that the protrusion can be manufactured in a simple and robust way.

In a more particular embodiment, the cylindrical mantle carries the second sealing element, the axial rib protruding no further from the cylindrical mantle than the radial extent of the second sealing element.

In a particular embodiment of the filter assembly, the corresponding threaded surfaces comprise a first outer thread and a second outer thread on the cover, and an inner thread on the base, the first outer thread and the second outer thread being axially separated by a non-threaded zone, wherein the non-threaded zone and the inner thread are configured to permit free axial movement of the filter element relative to the base over a certain axial range, whereby, when the filter element is in said range, the second sealing element is at least partially disengaged from the second sealing zone.

It is an advantage of this embodiment, that the user is made aware during disassembly of reaching the point at which drainage takes place (a small manual pull may still be necessary to fully disengage the drainage seal in configurations where the rotation does not cause complete disengagement), and that the user needs to take an extra step (pulling up the cover to engage the second portion of the thread) before the cover can be removed completely. This reduces the risk of inadvertently taking off the cover entirely while there is still liquid present in the housing.

In a particular embodiment, the outlet tube has a slanted end and the outlet orifice is arranged under a corresponding angle; and the predetermined orientation is an orientation in which the slanted end is parallel with the outlet orifice.

As the outlet orifice in the base and its sealing zone are arranged at an angle that corresponds to the slant of the outlet tube, this combination of features has the property of only providing correct operation when the angle of the filter element matches the base. Thus, the base used in this embodiment is protected against replacement of the filter element by an unsuitable filter element, provided that the manufacturer of the filter element distinguishes filter elements destined for different types of systems by different slant angles. If a catching surface (also known as a "fin", which may take the form of a radial protrusion on the cylinder mantle) is provided to force the filter element in a particular angular orientation during installation, the filter elements destined for different types of systems may further be differentiated by different relative angles between the fin and the direction of the slant.

In a particular embodiment, the second sealing element is arranged in a first slanted plane; the second sealing zone is provided in a second slanted plane; and the predetermined orientation is an orientation in which the first slanted plane is parallel with the second slanted plane.

It is an advantage of this embodiment that it allows a design whereby the drainage plug is capable of supporting the filter element in an upright position on a flat surface.

In an embodiment of the filter assembly according to the present invention, the outlet orifice comprises a standpipe and the first sealing zone is a part of an outer surface of the standpipe.

It is an advantage of this embodiment that it allows designs whereby a more complex fluid flow is desired, requiring the presence of a standpipe with multiple compartments.

According to an aspect of the present invention, there is provided a filter element comprising an outlet tube with a first sealing element and a drainage plug with a second sealing element, the outlet tube and the drainage plug being concentric, wherein the outlet tube and the drainage plug are positioned to sealingly engage with a first sealing zone of an outlet orifice and a second sealing zone of a drainage orifice of a base, respectively, at different consecutive stages of a filter element installation process.

In an embodiment of the filter element according to the present invention, the first sealing element and the second sealing element are positioned at different axial distances from an axial extremity of said filter element.

In a particular embodiment, the outlet tube has a slanted end and means to guide and maintain said filter element in a predetermined relative angular orientation when installed onto said base, and said first sealing element is substantially parallel to said slanted end.

In an embodiment of the filter element according to the present invention, the second sealing element is arranged in a slanted plane.

In an embodiment of the filter element according to the present invention, the drainage plug comprises a surface shaped as a cylindrical mantle, and the protrusion is formed as an axial rib, radially protruding from said cylindrical mantle, oriented along a direction parallel to the filter element's longitudinal axis.

In an embodiment of the filter element according to the present invention, the drainage plug comprises a surface shaped as a cylindrical mantle, and at least one opening is provided in said cylindrical mantle to facilitate and accelerate the drainage process.

According to an aspect of the present invention, there is provided a filter element for use in the filter assembly as described above.

The technical effects and advantages of the filter element according to the present invention correspond, mutatis mutandis, to those of the corresponding filter assembly according to the present invention.

BRIEF DESCRIPTION OF THE DRAWINGS

These and other features and advantages of embodiments of the present invention will now be described with reference to the accompanying drawings, in which.

DESCRIPTION OF EMBODIMENTS

Figure 1:
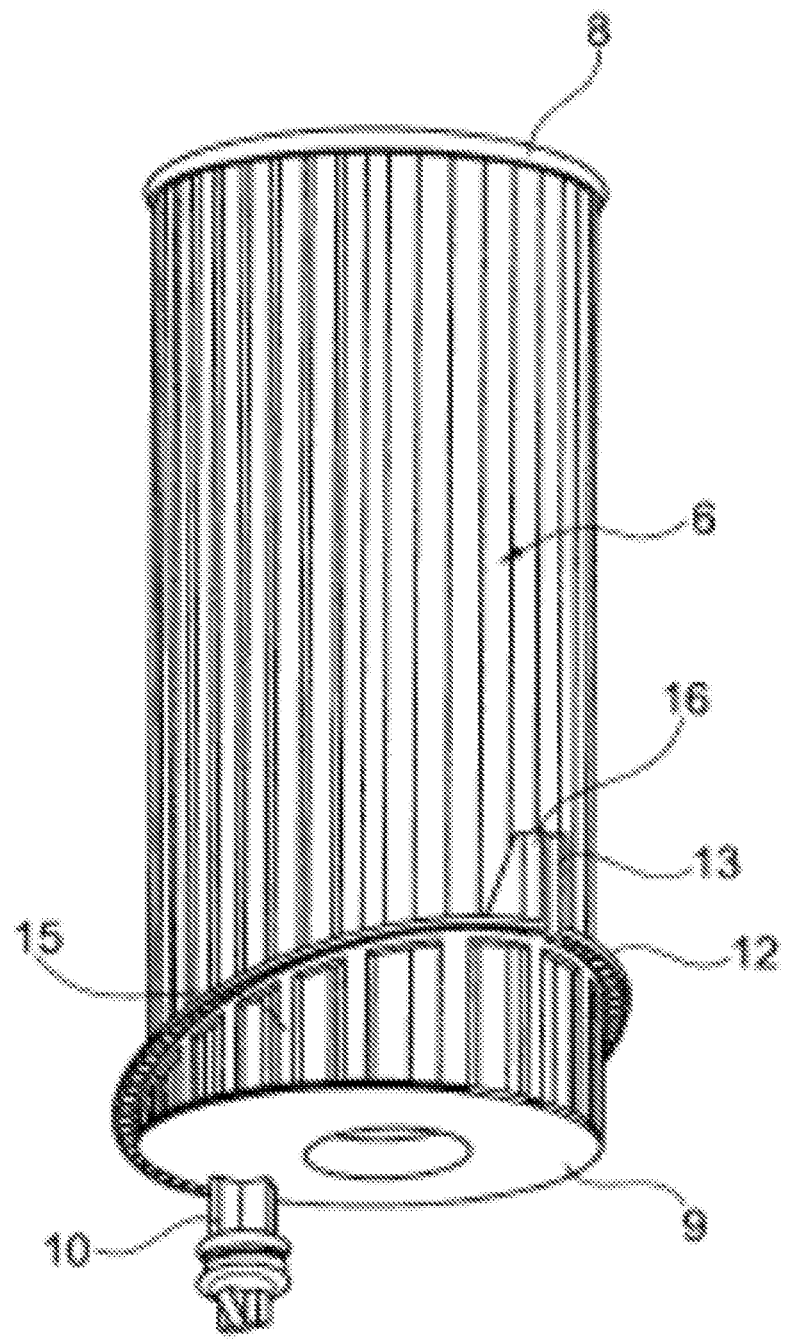
FIG. 1 illustrates a prior-art filter cartridge.

FIG. 1 illustrates a prior-art filter assembly for hydraulic fluids, in particular an oil filter assembly, as disclosed in DE 10 2013 202 446 A1. It has a separable, substantially cylindrical housing, which comprises a bowl-like lower part and a cover part that can be attached to it, and with a ring-shaped filter element that substantially consists of a filter surface 6 closed onto itself, in particular folded in a star-like manner, and substantially circular end discs 8, 9 that are connected with the ring-shaped edges of the filter surface. The filter element can be axially arranged into the lower part.

The figure further shows an eccentrically placed axial protrusion 10 on the lower end disc 9 of the filter cartridge, which plugs the drainage orifice when the filter cartridge is inserted in the correct position. When the filter cartridge is partially removed from its operational position, the drainage orifice will be unplugged, allowing the filter housing to be drained of used liquids prior to the complete removal of the filter cartridge.

Figure 2:
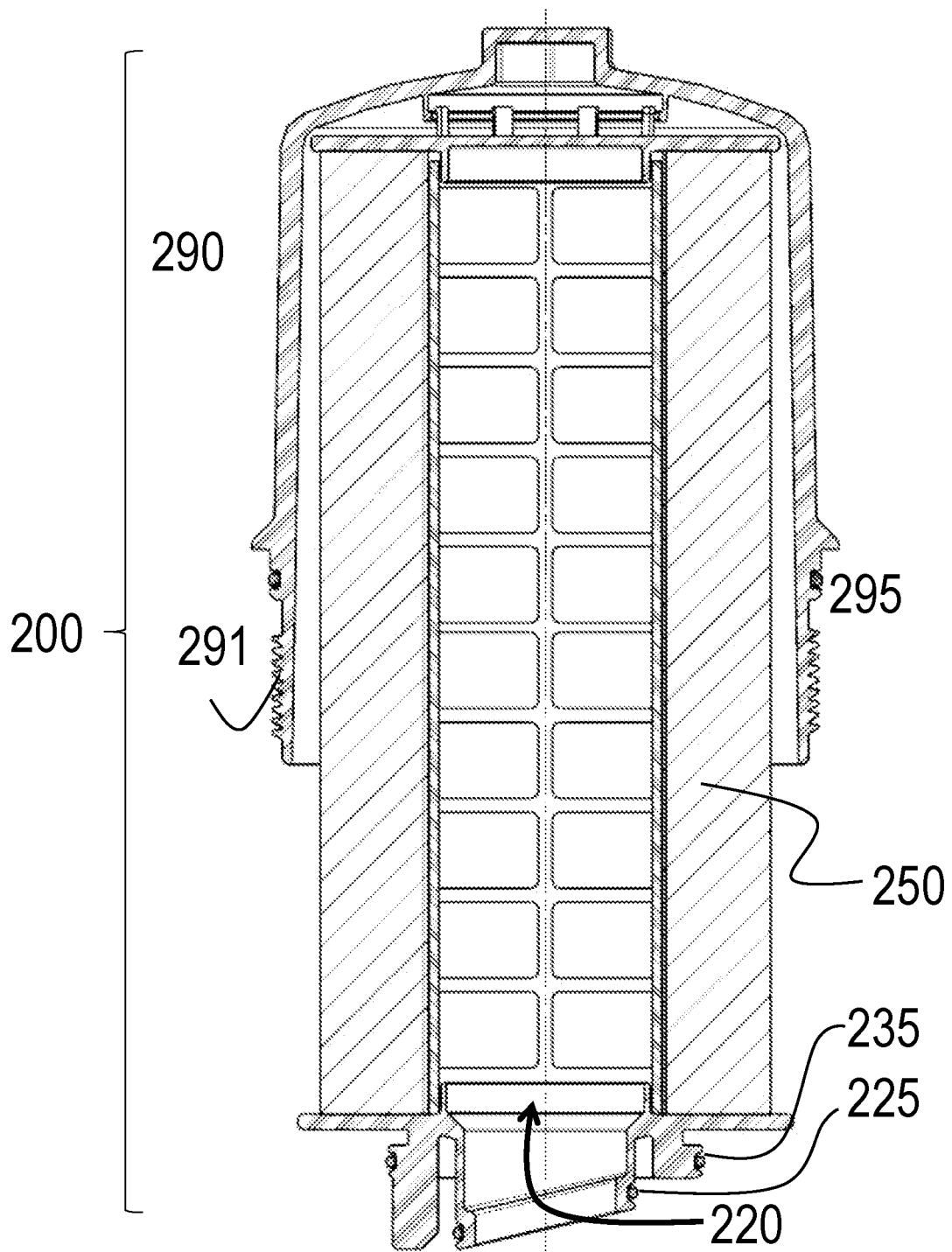
FIG. 2 illustrates a filter element according to an embodiment of the present invention, with a cover.

FIG. 2 illustrates an exemplary embodiment of a filter element 200 according to the present invention. The filter element 200 is partially inserted into a dome-shaped cover 290 which is adapted to be releasably engageable with a base, in a top-mounted arrangement. In particular, the base 100 (not shown in this Figure) may be adapted to receive the cover 290 by rotational engagement of corresponding threaded surfaces on the base 100 and the cover 290. In the illustrated case, a screw thread 291 is provided on a lower portion of the outer surface of the cover 290; the skilled person will appreciate that other fastening mechanisms may also be applied. The effect of using a screw thread is that a rotational movement imparted on the cover 290 containing the element will translate into an axial movement of the filter element 200, gradually engaging or disengaging the filter element 200 with the base 100.

A sealing element 295, such as an O-ring placed in a suitably positioned groove, is also provided on the cover 290 to seal the inside of the filter assembly from the outside, in cooperation with other sealing elements 225 and 235, which will be described in more detail below.

In use, the liquid to be filtered (e.g. engine lubricant) will be supplied under pressure to the peripheral portion of the filter element 200 via in an inlet orifice of the base (orifice 110 in FIG. 3, see below), it will pass through the filter medium 250 leaving impurities behind, and will be recirculated through the outlet orifice 220. For safety reasons, a bypass valve (not shown) may be provided to connect the periphery (inlet zone, containing unfiltered liquid) with the central portion of the element (outlet zone, containing filtered or "clean" liquid).

Figure 3:
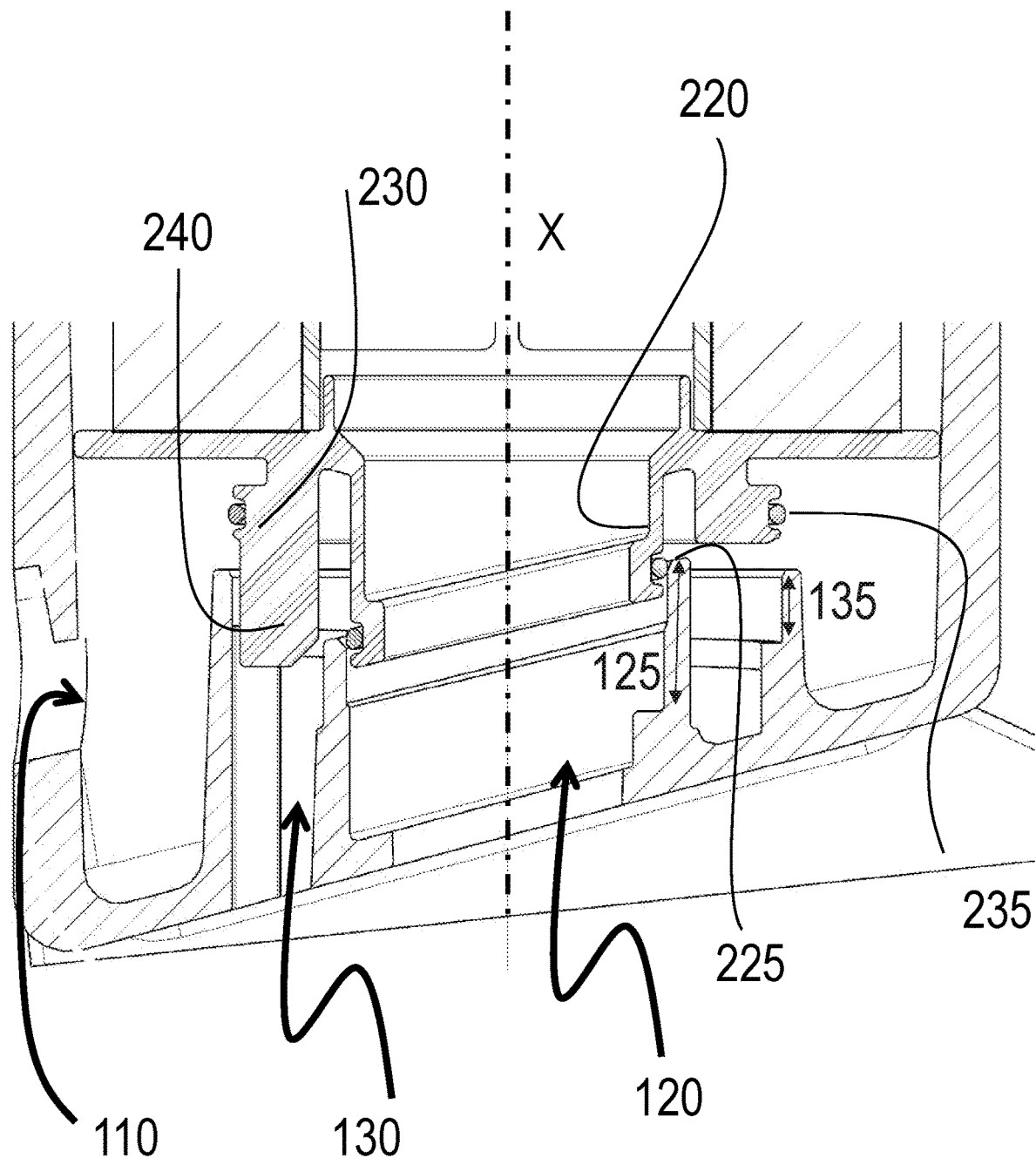
FIG. 3 illustrates a detail of a filter assembly according to an embodiment of the present invention.

FIG. 3 illustrates a detail of an exemplary embodiment of a filter assembly according to the present invention. The assembly comprises a base 100, a cover (not shown), and a substantially cylindrical filter element 200. The base 100 is adapted to releasably receive the cover with the filter element 200 at least partially inserted therein.

The base 100 has an outlet orifice 120 with a first sealing zone 125, and a drainage orifice 130 with a second sealing zone 135, the outlet orifice 120 and the drainage orifice 130 being concentric. The terms "first" and "second" are used herein to designate individual instances where multiple instances of the same element or similar elements are present in the described entity. These terms do not imply any order or precedence between the instances so described.

The filter element 200 comprises an outlet tube 220 with a first sealing element 225, and a drainage plug 230 with a second sealing element 235. The sealing elements 225 and 235 may consist of elastic O-rings placed in suitably positioned grooves. The drainage plug 230 may be a substantially cylindrical surface, shaped and positioned to be able to plug the drainage orifice 130 along its periphery. The outlet tube 220 and the drainage plug 230 are concentric and positioned to sealingly engage with the outlet orifice 120 and the drainage orifice 130, respectively, when the base 100 receives the cover, as a result of which the filter element 200 undergoes a downward axial movement.

The sealing zones 125 and 135 are defined by a portion of the cylindrical inner surface of the respective orifice, the diameter of which is sufficiently small to ensure adequate compression of the corresponding sealing elements 225 and 235 (see below) as soon as these sealing elements 225 and 235 are pushed down past the top ends of these respective sealing zones 125 and 135.

In the illustrated case, the outlet tube 220 has a slanted end and the outlet orifice 120 is arranged under a corresponding angle. Hence, in this embodiment, the surface of the free end does not extend in a plane orthogonal to the central axis (X) of the filter element, but rather extends at an acute angle to a plane orthogonal to said axis of at least 5°, typically at least 40°, and usually within the range of 5°-20°, inclusive (typically 7°-15°, inclusive). The slant angle may be selected by the designer of the filter unit, taking into account the trade-off between the amount of filter unit height lost by the presence of the slanted end, and the importance of the need to avoid incorrect installations. As the filter element 200 is prone to rotating along with the cover 290 when the latter is being screwed onto the base 100, the base 100 and the filter element 200 preferably comprise cooperating means to guide and maintain the filter element 200 in a predetermined angular orientation when the cover 290 is received by the base 100; this predetermined orientation is an orientation in which the said slanted end is parallel with the outlet orifice 120, ensuring a good fluid communication and good cooperation of the sealing element 225 and the sealing zone 125. The cooperating means may include a fin 240 and a catching surface on the base (not shown), the operation of which is explained in more detail below with reference to FIG. 7.

According to the invention, the axial distance between the first sealing element 225 and the second sealing element 235 is different from an axial distance between the end of the first sealing zone 125 facing the filter element 200 (i.e., the top end of the first sealing zone 125) and an end of the second sealing zone 135 facing the filter element 200 (i.e., the top end of the second sealing zone 135).

As the distance between the sealing elements 225 and 235 on the filter element 200, is different from the distance between the point of entrance/exit of the respective sealing zones 125 and 135 with which they engage, the respective seals of the drainage orifice 130 and the outlet orifice 120 engage at different times when the filter element 200 is inserted into the base 100, and disengage at different times when the filter element 200 is removed from the base 100. In particular, when removal of the filter element 200 is started by unscrewing the cover to which the filter element 200 is attached, the seal 135/235 of the drainage orifice 130 will disengage first, allowing the remaining liquid in the filter element 200 to drain away from the base while the outlet orifice 120 is still sealed.

It should be noted that the diameter of one or both of the sealing zones 125 and 135 may be variable along the axial direction. Accordingly, an upper portion of a sealing zone may be wider than a lower portion, leading to an increasing tightness of the seal as the filter element 200 is pushed further down, and conversely a decreasing tightness of the seal as the filter element 200 is pulled up. To avoid creating an upward reaction force of the sealing zone onto the filter element 200, a step-wise varying diameter is preferred over a continuously varying diameter (conical orifice). In a preferred embodiment, the diameter of the first sealing zone 125 is stepwise varied in such a way that the first sealing element 225 is only slightly compressed (e.g., compression of approximately 5%; sufficient to be impermeable to liquid under hydrostatic pressure) when the plug 230 of the filter element 200 is disengaged from the drainage orifice 130, and that the first sealing element 225 is normally compressed (e.g., compression in a range of approximately 20%-30%; sufficient to be impermeable to the liquid under operational pressure) when the filter element 200 is fully engaged (i.e., the cover is completely screwed on to a tight fit). The wear of the sealing element 225 is thus reduced, as it is not always fully compressed.

Figure 4:
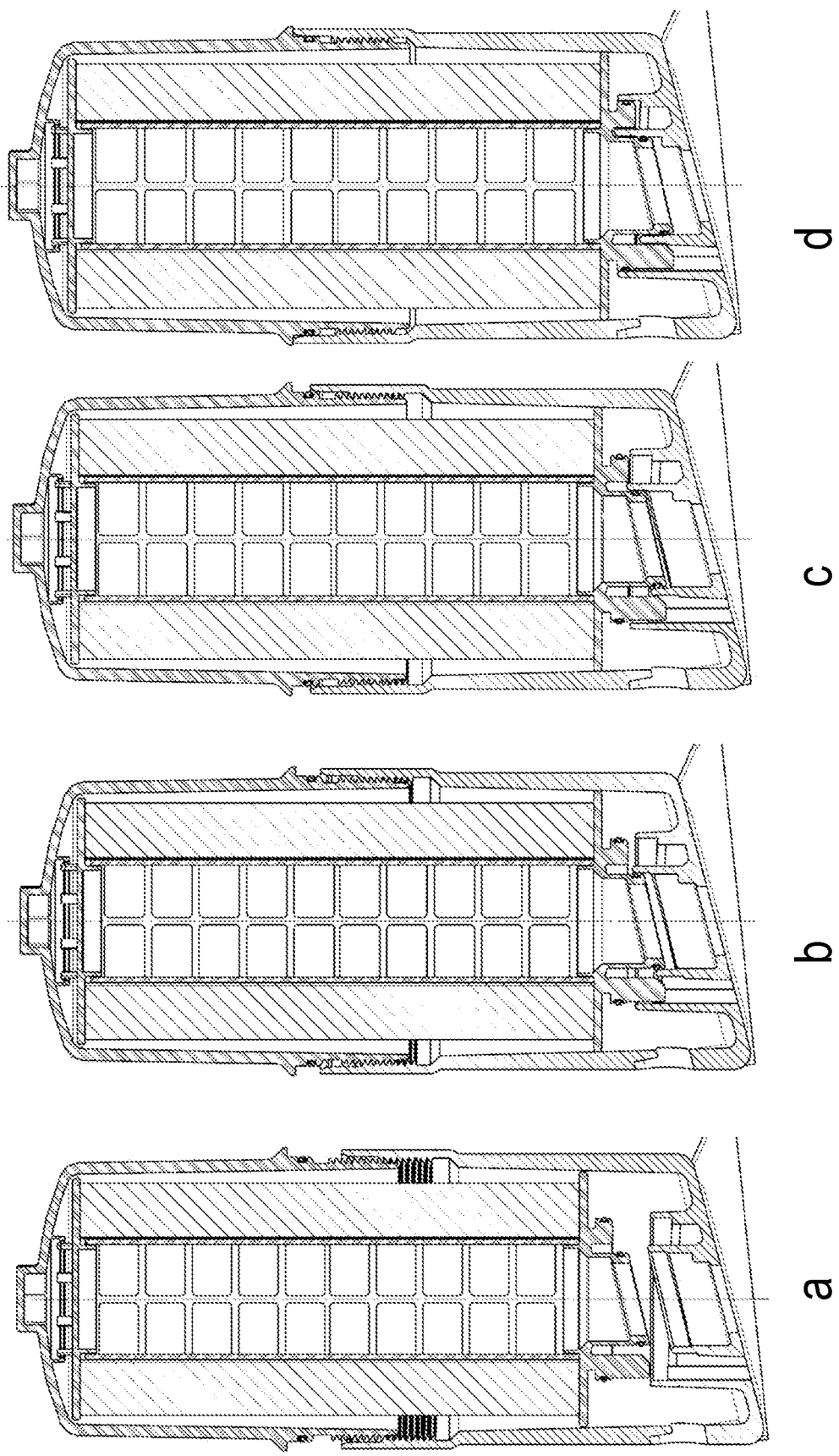
FIG. 4 illustrates various stages of the installation or removal of a filter element according to the embodiment of FIG. 2.

A filter element 200 installation operation in an embodiment of the assembly according to the present invention, including a filter element 200 as shown in FIG. 2, is schematically illustrated in FIG. 4. The filter element 200 may be placed so that the outer thread 291 on the cover 290 makes contact with the inner thread on the base 100 (situation a in FIG. 4), without regard to angular orientation. When the cover 290 is rotated in a clockwise direction, the threaded surfaces engage and the filter element 200 moves downwards in the axial direction, in accordance with the pitch of the screw thread. This axial movement causes the sealing element 225 of the outlet tube 220 to reach the sealing zone 125 of the outlet orifice 120 (situation b in FIG. 4) after traveling a predetermined distance, e.g. 5 mm.

With an exemplary thread pitch of 3 mm, the transition towards this point requires a little less than two full rotations. During at least part of the first full rotation, the filter element 200 will rotate along with the cover 290. If the filter element 200 and the engaging portion of the base 100 have a rotational asymmetry, as in the illustrated case, and thus require a particular relative angular orientation in order to properly engage, a catching surface or mechanism must be provided that keeps the filter element 200 in a fixed angular orientation when it reaches the desired orientation.

Alternatively, the angular orientation may be completely fixed before the sealing element 225 of the outlet tube 220 reaches the sealing zone 125 of the outlet orifice 120.

If the clockwise rotation of the cover 290 is continued, the filter element 200, now in its desired angular orientation, will be pushed down further causing further compression of the sealing element 225 of the outlet tube 220 (situation c in FIG. 4). This transition may involve an exemplary travel of 6 mm or two full rotations.

The next stage is the engagement of the sealing element 235 of the drainage plug 230 with the sealing zone 135 of the drainage orifice. With the outlet orifice 120 and the drainage orifice 130 properly sealed, the system is ready for operation. A little additional travel may be required (e.g., 9 mm or up to three additional rotations) to secure the cover sufficiently tightly to withstand the vibrations that occur in normal operation and to compress the seal 295 of the cover 290 (situation d in FIG. 4). (situation d in FIG. 4).

The removal process of the filter element 200, may be described with reference to the same Figures. Initially, the cover 290 is tightly secured to the base 100 (situation d in FIG. 4). By turning the cover 290 counter-clockwise, upward travel of the filter element 200 is obtained. Using the same exemplary dimensioning as described before, it will take three full rotations to cause the filter element 200 to be lifted 9 mm, enough to disengage the sealing element 235 of the drainage plug 230 from the sealing zone 135 of the drainage orifice 130 (situation c in FIG. 4). At this point, any liquid still present in the base 100 can drain away through the drainage orifice 130 while the outlet orifice 120 is still sealed, thus avoiding any risk of contamination of the "clean" side of the system. The assembly may be left in this position for a little while, allowing enough time for all the liquid to be evacuated. The time required for the evacuation of the liquid, depends on various system design parameters; it is an advantage of embodiments of the present invention that a relatively large drainage orifice can be provided, considerably reducing the time required for the draining, and hence, the total time of the servicing session. This is true in particular in system designs where the drainage channel provided by the filter element is the limiting factor for the drainage flow. Preferably, the time required to drain a filter element according to an embodiment of the present invention designed for use in heavy-duty equipment, is less than 15 minutes; more preferably, less than 10 minutes; and most preferably, less than 5 minutes.

If the counter-clockwise rotation of the cover 280 is continued, the filter element 200 will be pulled up further, causing disengagement of the sealing element 225 of the outlet tube 220 from the sealing zone 125 of the outlet orifice 120 (situation b in FIG. 4). This transition may involve an exemplary travel of 6 mm or two full rotations.

A final rotation will pull up the filter element 200 far enough to completely disengage the screw thread of the cover 290 from the screw thread of the base 100, such that the cover can be lifted vertically and the filter element 200 can be removed from the cover 290 for disposal or recycling (situation a in FIG. 4).

Figure 5:
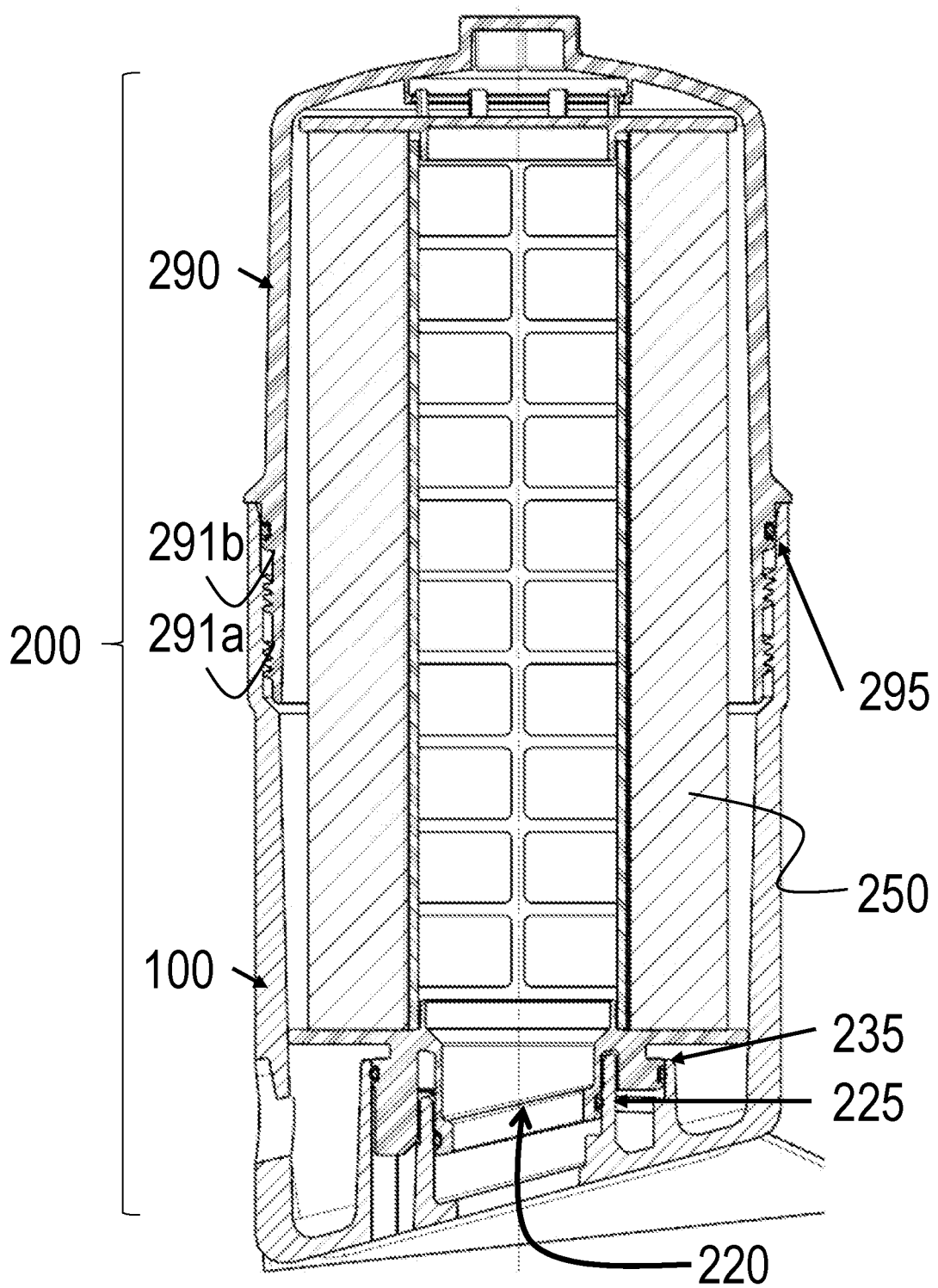
FIG. 5 illustrates a filter element according to another embodiment of the present invention, with a cover.

Another embodiment of the filter element 200 according to the present invention is illustrated, in an assembled state, in FIG. 5. The same numerals introduced for elements shown in FIGS. 2 and 3 are used for the same elements in FIG. 5. The description provided above for the embodiment of FIG. 2 applies to the embodiment of FIG. 5 as well, with the following exception: the screw thread 291, provided on the lower portion of the outer surface of the cover 290, is now interrupted; i.e., it consists of two threaded zones 291a and 291b, axially separated by a non-threaded zone.

Figure 6:
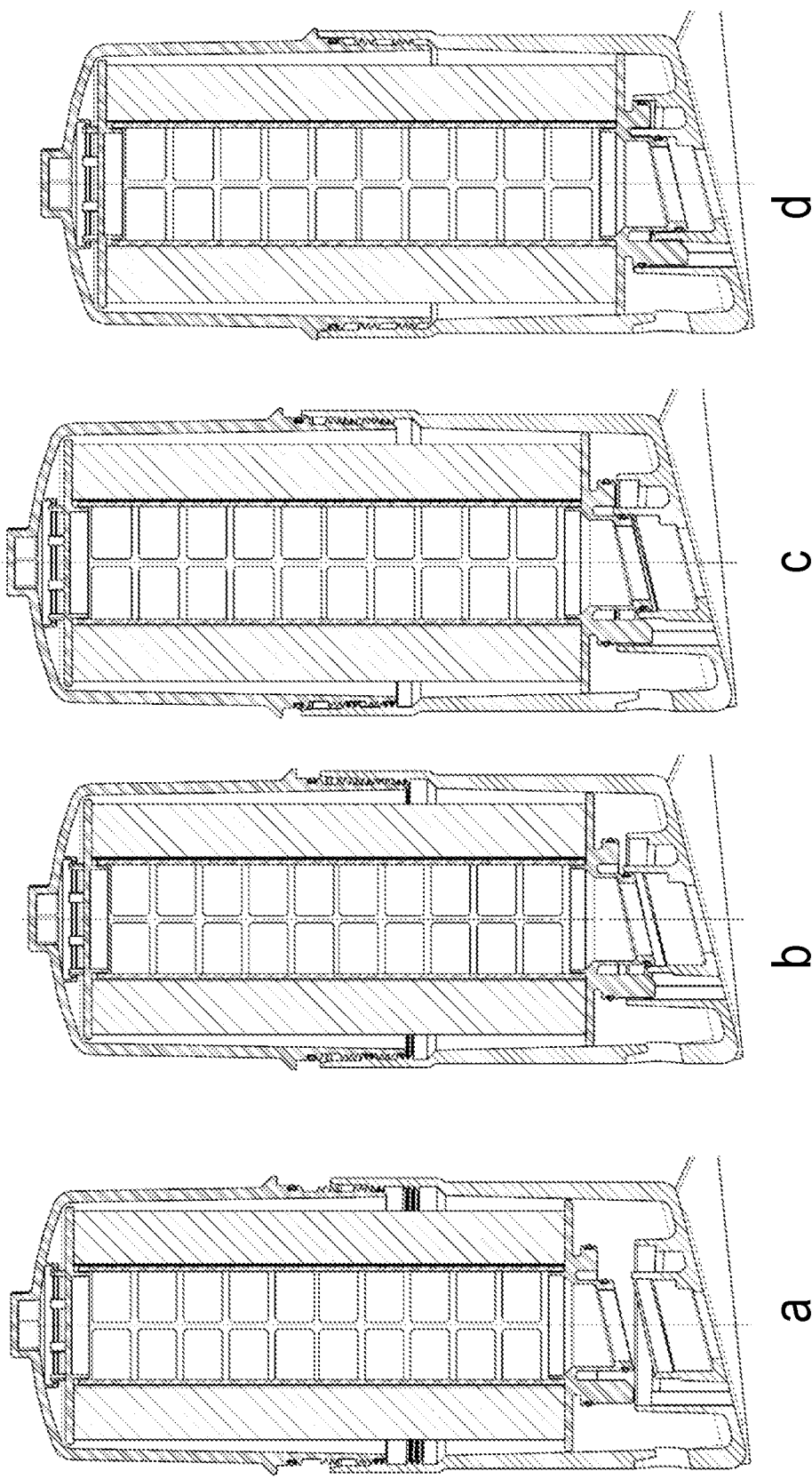
FIG. 6 illustrates various stages of the installation or removal of a filter element according to the embodiment of FIG. 5.

A filter element 200 installation operation in an embodiment of the assembly according to the present invention, including a filter element 200 as shown in FIG. 5, is schematically illustrated in FIG. 6. The filter element 200 may be placed so that the lower outer thread 291a on the cover 290 makes contact with the inner thread on the base 100 (situation a in FIG. 6), without regard to angular orientation. When the cover 290 is rotated in a clockwise direction, the threaded surfaces engage and the filter element 200 moves downwards in the axial direction, in accordance with the pitch of the screw thread. This axial movement causes the sealing element 225 of the outlet tube 220 to reach the sealing zone 125 of the outlet orifice 120 (situation b in FIG. 6) after traveling a predetermined distance, e.g. 6 mm. With an exemplary thread pitch of 3 mm, the transition towards this point requires approximately two full rotations.

If the clockwise rotation of the cover 290 is continued, the filter element 200 will be pushed down further causing further compression of the sealing element 225 of the outlet tube 220 (situation c in FIG. 6). This transition may involve an exemplary travel of 4 mm or 1 and ⅓ rotations.

During approximately the first 4 and ⅓ rotations described above (the actual required rotation will also depend on the relative angular orientation of the starting point of the thread of the cover and the catching surface), the filter element 200 will rotate along with the cover 290. If the filter element 200 and the engaging portion of the base 100 have a rotational asymmetry, as in the illustrated case, and thus require a particular relative angular orientation in order to properly engage, a catching surface (cfr. element 240 in FIG. 7) or mechanism must be provided that keeps the filter element 200 in a fixed angular orientation when it reaches the desired orientation. In the illustrated embodiment, the catching surface or mechanism engages when situation c is reached.

After another 5 mm of downward travel (or approximately 1 and ⅔ more rotations), the lower outer thread 291a disengages, allowing the filter unit to be pushed down manually over a distance determined by the axial extent of the inner thread of the base 100 and the axial extent of the separation between the outer threads 291a, 291b on the cover 290; this distance may be around 3 mm. By gently pushing the filter unit 100 down, an engagement is achieved of the sealing element 235 of the drainage plug 230 with the sealing zone 135 of the drainage orifice. With the outlet orifice 120 and the drainage orifice 130 properly sealed, the system is ready for operation. A little additional travel (e.g., 9 mm or up to three additional rotations), as afforded by the engagement of the upper outer thread 291b of the cover 290 with the thread of the base 100, may be required to secure the cover sufficiently tightly to withstand the vibrations that occur in normal operation and to compress the seal 295 of the cover 290 (situation d in FIG. 6).

The removal process of the filter element 200, may be described with reference to the same Figures. Initially, the cover 290 is tightly secured to the base 100 (situation d in FIG. 6). By turning the cover 290 counter-clockwise, upward travel of the filter element 200 is obtained. Using the same exemplary dimensioning as described before, it will take three full rotations to cause the filter element 200 to be lifted 9 mm, enough to partly disengage the sealing element 235 of the drainage plug 230 from the sealing zone 135 of the drainage orifice 130 (situation c in FIG. 6). The user will be able to notice that this point has been reached, because the upper outer thread 291b of the cover 290 now disengages from the thread of the base, whereupon further rotations will not generate any axial movement. At this point, the user can gently pull the filter unit 100 up to completely disengage the sealing element 235 of the drainage plug 230 from the sealing zone 135 of the drainage orifice 130, such that any liquid still present in the base 100 can drain away through the drainage orifice 130 while the outlet orifice 120 is still sealed, thus avoiding any risk of contamination of the "clean" side of the system. The assembly may be left in this position for a little while, allowing enough time for all the liquid to be evacuated.

In order to be able to continue the unscrewing of the cover 280, the cover must be manually pulled upwards to allow the lower outer thread 291a to engage with the thread of the base from below. Further unscrewing will cause disengagement of the sealing element 225 of the outlet tube 220 from the sealing zone 125 of the outlet orifice 120 (situation b in FIG. 6). This transition may involve an exemplary travel of 5 mm or 1 and ⅓ rotations.

A final rotation will pull up the filter element 200 far enough to completely disengage the lower outer screw thread 291a of the cover 290 from the screw thread of the base 100, such that the cover can be lifted vertically and the filter element 200 can be removed from the cover 290 for disposal or recycling (situation a in FIG. 6).

It should be noted that the filter element 200 and the base 100 may alternatively be configured in such a way that the complete free axial movement that is possible when the inner thread of the base 100 is in the zone between the outer threads 291a, 291b of the cover 290 occurs with the sealing element 235 of the drainage plug 230 being disengaged from the sealing zone 135 of the drainage orifice 130. In this case, there is no engagement of the sealing element 235 with the sealing zone 135 when the filter element 200 reaches the lower portion of the free axial travel zone. In such a configuration, the engagement of the sealing element 235 with the sealing zone 135 is effected by the downward vertical movement generated by rotating the cover clockwise while the upper outer thread 291b of the base is engaged with the inner thread of the base 100. Conversely, in such a configuration, the disengagement of the sealing element 235 from the sealing zone 135 (i.e., the opening of the drainage channel) is effected by the upward vertical movement generated by rotating the cover counterclockwise while the upper outer thread 291b of the base is engaged with the inner thread of the base 100, rendering the above mentioned upward pull to open the drainage channel unnecessary.

Figure 7:
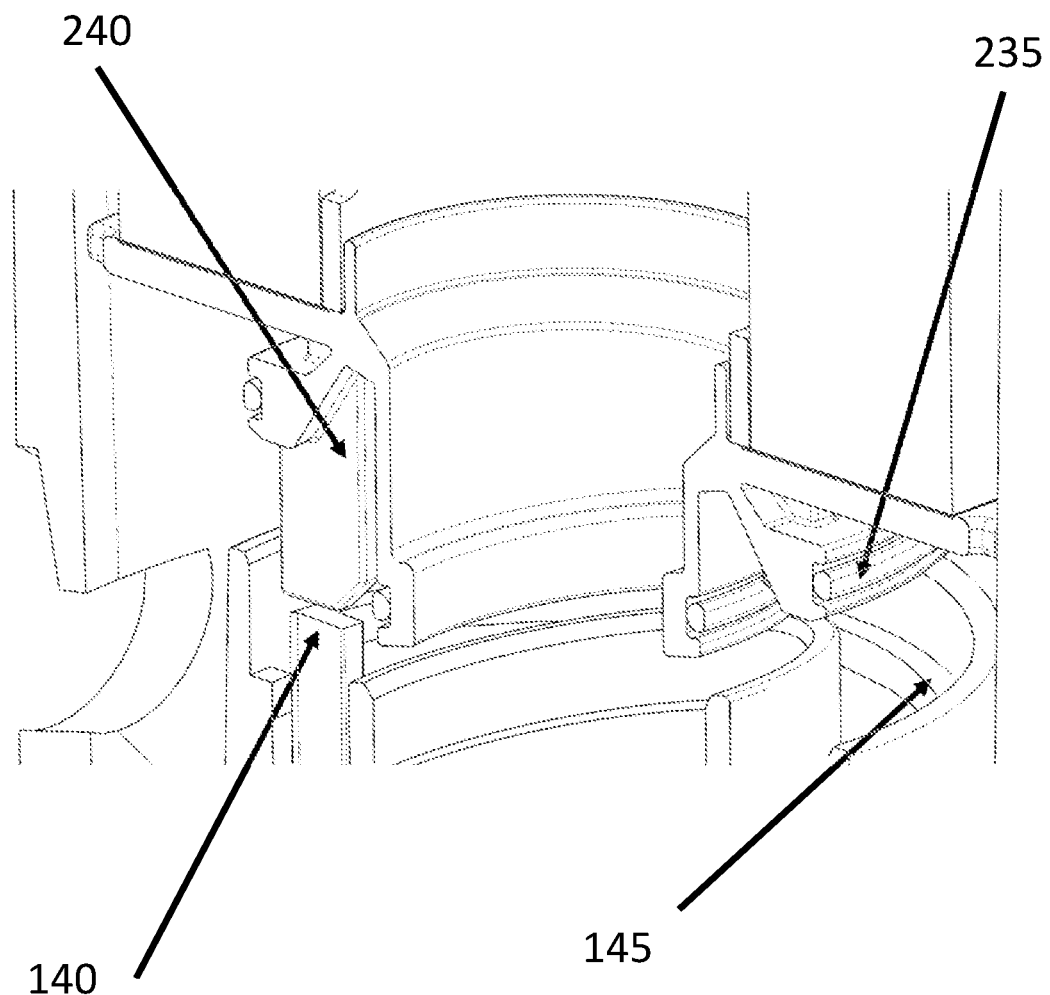
FIG. 7 illustrates means to guide and maintain a filter element according to an embodiment of the present invention in a predetermined angular orientation when the cover is received by the base.

FIG. 7 illustrates an exemplary catching mechanism that allows the filter element 200 to reach and maintain a certain desired angular orientation during the installation. The mechanism includes a catching element or "fin" 240 provided on the filter element 200, and a cooperating catching surface 140 on the base 100. When, during the installation of the filter element 200, the axial position of the filter element 200 is lowered to the point where the fin 240 reaches the catching surface 140, the latter impedes any further rotation of the filter element 200. The catching surface 140 is preferably provided as an upright edge of a circumferential ridge or ramp that slopes downwards in the clockwise direction at a pitch which exceeds the pitch of the cooperating threads of the cover 290 and the base 100. The term "at a pitch" does not exclude arrangements where the pitch varies along the circumference.

Figure 8:
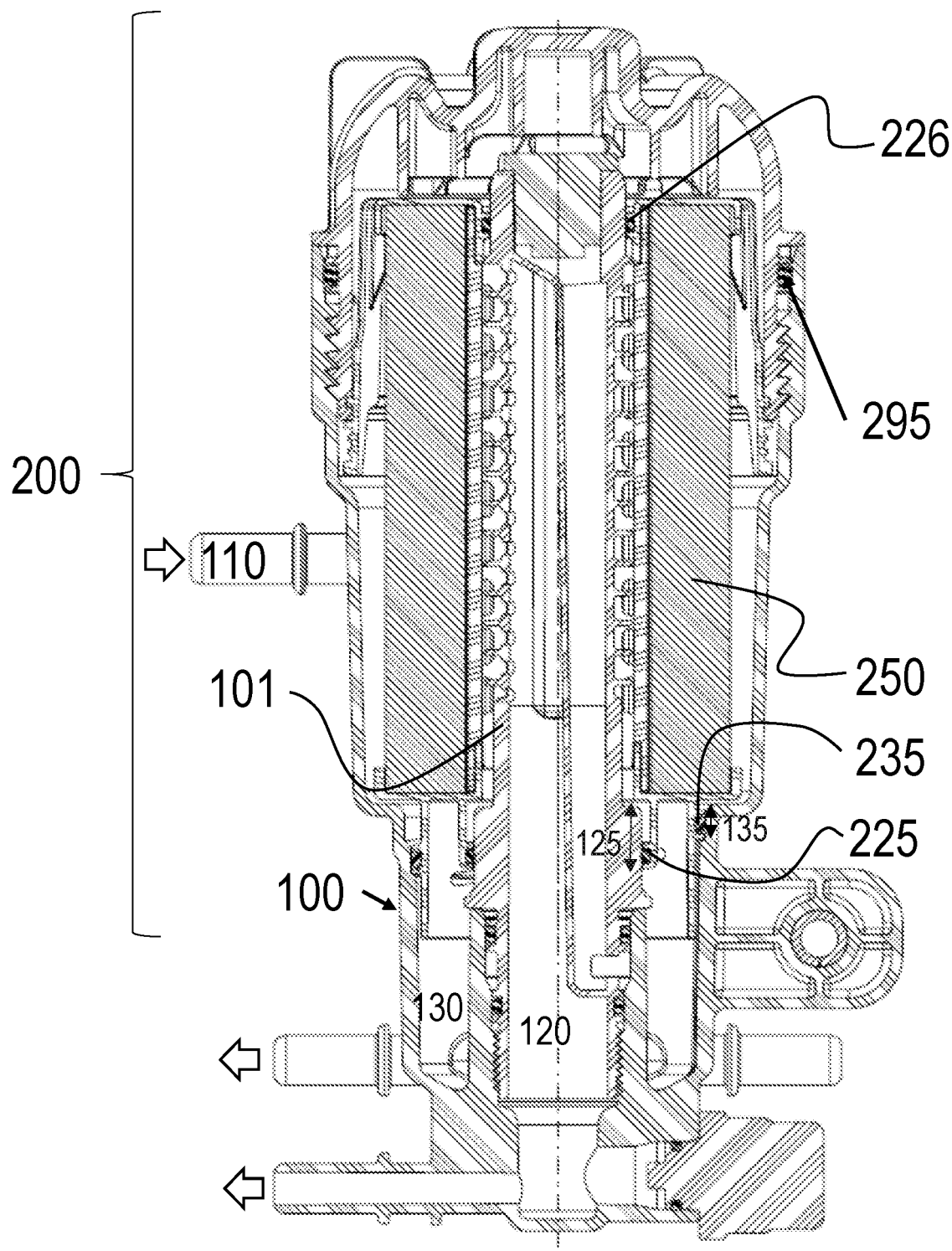
FIG. 8 illustrates a detail of a filter assembly according to another embodiment of the present invention.

FIG. 8 illustrates a detail of another exemplary embodiment of a filter assembly according to the present invention. The assembly comprises a base 100, a cover 290, and a substantially cylindrical filter element 200. The base 100 is adapted to releasably receive the cover 290 with the filter element 200 at least partially inserted therein. In contrast to the embodiments described above, the base 100 of the embodiment of FIG. 8 includes an integrated standpipe 101. Regardless of whether the standpipe 101 is manufactured separately from the rest of the base 100 and regardless of whether the standpipe 101 is removably attached to the rest of the base 100, the standpipe 101 shall be considered as part of the base 100 for the purposes of the present disclosure, and in particular as part of the outlet orifice 120. The part of the standpipe that is on the left side in the Figures, is the conduit for the fluid that has passed through the filter medium, and must therefore be considered as part of the "clean side" of the filter system.

The standpipe 101 aids in centering the filter element 200 during installation. The filter element 200 has a central cavity, typically defined by a filter liner, which fits closely around the standpipe 101, leaving an amount of radial play of for instance between 0.2 and 1 mm on every side. As the filter element 200 travels axially down the standpipe 101, the inner sealing elements (in particular, the first sealing element 225 and its counterpart 226 at the top of the clean side of the filter element 200) will not cause any friction as they cannot engage with the corresponding sealing zones until the very last stage of the installation.

The base 100 has an outlet orifice 120 (in this case, provided in the form of the standpipe 101) with a first sealing zone 125, and a drainage orifice 130 with a second sealing zone 135, the outlet orifice 120 and the drainage orifice 130 being concentric. The terms "first" and "second" are used herein to designate individual instances where multiple instances of the same element or similar elements are present in the described entity. These terms do not imply any order or precedence between the instances so described.

The filter element 200 comprises an outlet tube 220 with a first sealing element 225, and a drainage plug 230 with a second sealing element 235. The sealing elements 225 and 235 may consist of elastic O-rings placed in suitably positioned grooves. The drainage plug 230 may be a substantially cylindrical surface, shaped and positioned to be able to plug the drainage orifice 130 along its periphery. The outlet tube 220 and the drainage plug 230 are concentric and positioned to sealingly engage with the outlet orifice 120 and the drainage orifice 130, respectively, when the base 100 receives the cover, as a result of which the filter element 200 undergoes a downward axial movement.

The first sealing zone 125 is defined by a portion of the cylindrical outer surface of the outlet orifice 120, in particular the standpipe 101, the diameter of which is sufficiently large to ensure adequate compression of the corresponding sealing element 225 (see below) as soon as this sealing element 225 is pushed down past the top end of this sealing zone 125. In contrast to the first sealing element 225 of the embodiments described above, the first sealing element 225 of the present embodiment is an inwardly facing sealing element, preferably an O-ring disposed in an appropriately shaped groove. The second sealing zone 135 is defined by a portion of the cylindrical inner surface of the drainage orifice 130, the diameter of which is sufficiently small to ensure adequate compression of the corresponding sealing element 235 (see below) as soon as this sealing element 235 is pushed down past the top end of this sealing zone 135. The second sealing element 225 is an outwardly facing sealing element, preferably an O-ring disposed in an appropriately shaped groove.

In the illustrated case, unlike the previously described embodiments, the outlet tube 220 does not have a slanted end. However, the outer seal 135/235, which secures the drainage orifice, is now slanted, i.e. it is provided at an acute angle to a plane orthogonal to said axis. The slant angle may be selected by the designer of the filter unit, taking into account the trade-off between the amount of filter unit height lost by the presence of the slanted end, and the importance of the need to avoid incorrect installations. It is an advantage of having the outer seal as the slanted seal, that the slanting angle may be reduced (relative to the situation where the inner seal is the slanted seal), while maintaining the same degree of protection against fitting the wrong type of filter. When the second sealing element 235 takes the form of an O-ring, as in the illustrated cases, an exemplary way of determining a suitable angle to provide protection against fitting a filter having a non-slanted second seal consists of considering the center-to-center height difference ΔH between highest and lowest points of the O-ring 235, which may be expressed as a function of the diameter D of the second sealing zone 135, the cross-sectional diameter d of the O-ring 135, and the slant angle α:

$$\Delta H = (D+d) \times \tan \alpha$$

A certain degree of protection against incorrect fitting is obtained as soon as ΔH>d. The inventors have found that in practice, better protection is obtained by choosing a slightly larger value for ΔH, for example ΔH>3/2 d.

As the filter element 200 is prone to rotating along with the cover 290 when the latter is being screwed onto the base 100, the base 100 and the filter element 200 preferably comprise cooperating means to guide and maintain the filter element 200 in a predetermined angular orientation when the cover 290 is received by the base 100; this predetermined orientation is an orientation in which the said slanted end is parallel with the outlet orifice 120, ensuring a good fluid communication and good cooperation of the sealing element 225 and the sealing zone 125. The cooperating means may include a fin 240 and a catching surface on the base (not shown), the operation of which is explained in more detail below with reference to FIG. 11.

According to the invention, the axial distance between the first sealing element 225 and the second sealing element 235 is different from an axial distance between the end of the first sealing zone 125 facing the filter element 200 (i.e., the top end of the first sealing zone 125) and an end of the second sealing zone 135 facing the filter element 200 (i.e., the top end of the second sealing zone 135).

As the distance between the sealing elements 225 and 235 on the filter element 200, is different from the distance between the point of entrance/exit of the respective sealing zones 125 and 135 with which they engage, the respective seals of the drainage orifice 130 and the outlet orifice 120 engage at different times when the filter element 200 is inserted into the base 100, and disengage at different times when the filter element 200 is removed from the base 100. In particular, when removal of the filter element 200 is started by unscrewing the cover to which the filter element 200 is attached, the seal 135/235 of the drainage orifice 130 will disengage first, allowing the remaining liquid in the filter element 200 to drain away from the base while the outlet orifice 120 is still sealed.

It should be noted that the diameter of one or both of the sealing zones 125 and 135 may be variable along the axial direction. Accordingly, an upper portion of the first sealing zone 125 may be narrower than a lower portion, leading to an increasing tightness of the first seal 125/225 as the filter element 200 is pushed further down, and conversely a decreasing tightness of the seal as the filter element 200 is pulled up. Likewise, an upper portion of the second sealing zone 135 may be wider than a lower portion, leading to an increasing tightness of the second seal 135/235 as the filter element 200 is pushed further down, and conversely a decreasing tightness of the seal as the filter element 200 is pulled up. To avoid creating an upward reaction force of the sealing zone onto the filter element 200, a step-wise varying diameter is preferred over a continuously varying diameter (conical orifice). In a preferred embodiment, the diameter of the first sealing zone 125 is stepwise varied in such a way that the first sealing element 225 is only slightly compressed (e.g., compression of approximately 5%; sufficient to be impermeable to liquid under hydrostatic pressure) when the plug 230 of the filter element 200 is disengaged from the drainage orifice 130, and that the first sealing element 225 is normally compressed (e.g., compression in a range of approximately 20%-30%; sufficient to be impermeable to the liquid under operational pressure) when the filter element 200 is fully engaged (i.e., the cover is completely screwed on to a tight fit). The wear of the sealing element 225 is thus reduced, as it is not always fully compressed.

Figure 9:
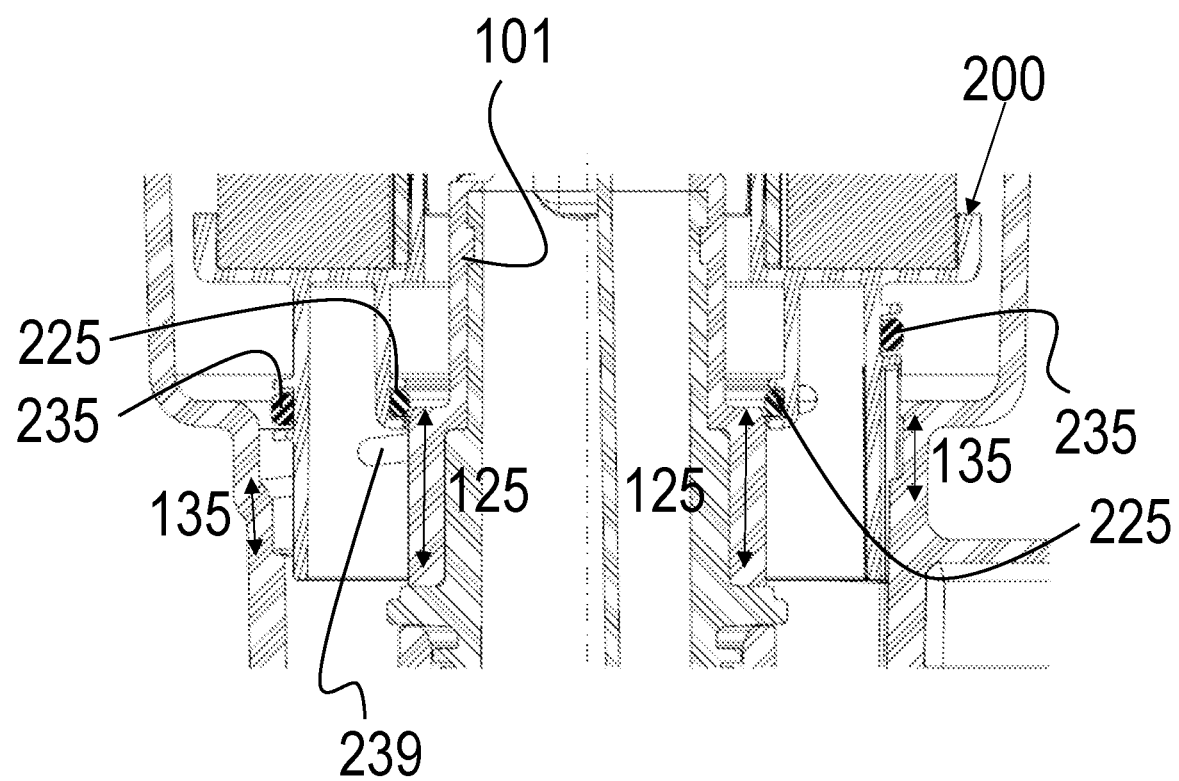
FIG. 9 illustrates a detail of the filter assembly according to the embodiment of FIG. 8.

FIG. 9 further illustrates a detail of the filter assembly of FIG. 8, situated at the point where the first (inner) sealing element 225 just marginally engages with the corresponding first sealing zone 125, and where the second sealing (outer) element 235 does not engage with the corresponding second sealing zone 135. A slot-shaped opening 239 is provided in the lower cylindrical mantle of the filter element 200, which facilitates and accelerates the drainage process.

Figure 10:
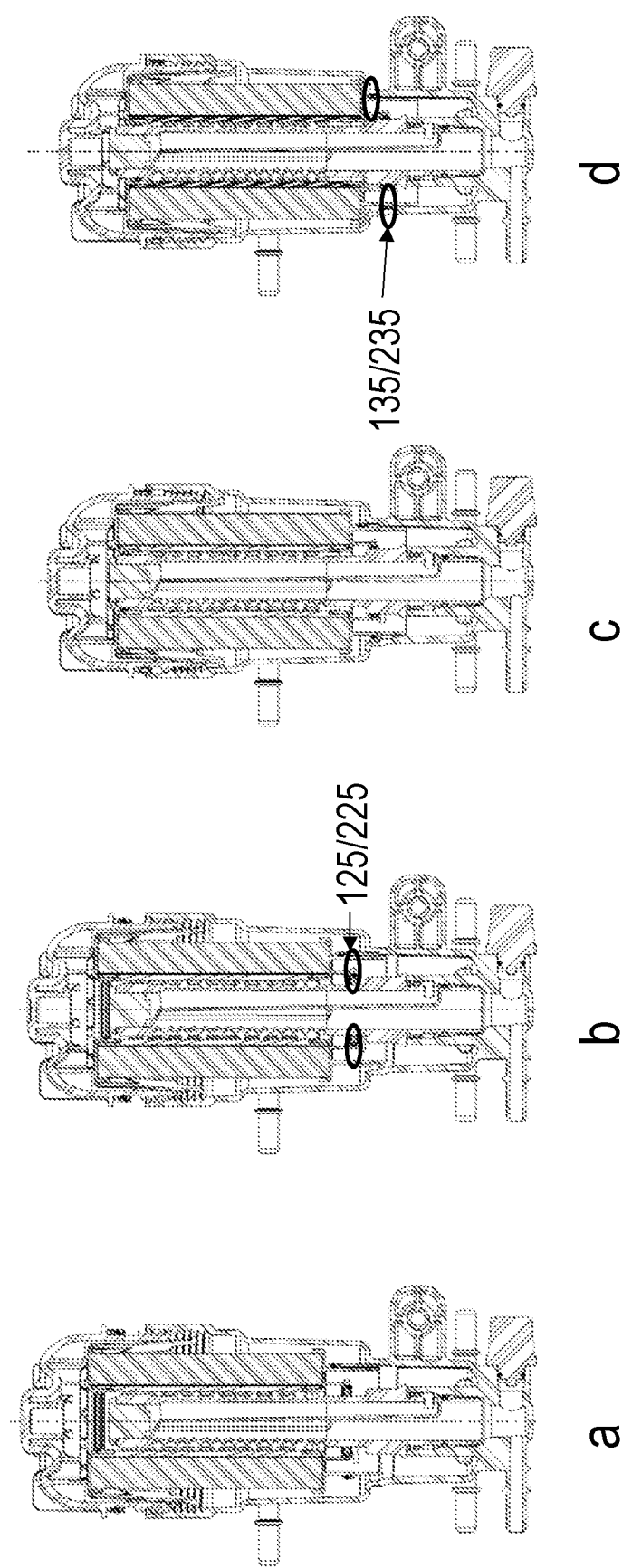
FIG. 10 illustrates various stages of the installation or removal of a filter element according to the embodiment of FIG. 8.

A filter element 200 installation operation of the embodiment of FIG. 8 is schematically illustrated in FIG. 10. The filter element 200 may be placed so that the outer thread 291 on the cover 290 makes contact with the inner thread on the base 100 (situation a in FIG. 10), without regard to angular orientation. When the cover 290 is rotated in a clockwise direction, the threaded surfaces engage. As the cover is rotated further, the filter element 200 will rotate along with the cover and move downwards in the axial direction, in accordance with the pitch of the screw thread. This movement eventually causes the protrusion 240 to catch on the catching surface 140 (situation b in FIG. 10), locking the filter element 200 in the desired angular orientation regardless of further rotations of the cover.

Further axial movement causes the sealing element 225 of the outlet tube 220 to reach the sealing zone 125 of the outlet orifice 120 (situation b in FIG. 10) after traveling a predetermined distance. If the clockwise rotation of the cover 290 is continued, the filter element 200 will be pushed down further causing further compression of the sealing element 225 of the outlet tube 220 (situation c in FIG. 10).

The next stage is the engagement of the sealing element 235 of the drainage plug 230 with the sealing zone 135 of the drainage orifice 130. With the outlet orifice 120 and the drainage orifice 130 properly sealed, the system is ready for operation. A little additional travel may be required to secure the cover sufficiently tightly to withstand the vibrations that occur in normal operation and to compress the seal 295 of the cover 290 (situation d in FIG. 10).

Thus, during installation, the first sealing element 225 and its counterpart 226 engages first, followed by the second sealing element 235, and finally followed by the seal 295 of the cover 290.

The removal process of the filter element 200, may be described with reference to the same Figures. Initially, the cover 290 is tightly secured to the base 100 (situation d in FIG. 10). By turning the cover 290 counter-clockwise, upward travel of the filter element 200 is obtained. Further rotations will cause the filter element 200 to be lifted enough to disengage the sealing element 235 of the drainage plug 230 from the sealing zone 135 of the drainage orifice 130 (situation c in FIG. 10). At this point, any liquid still present in the base 100 can drain away through the drainage orifice 130 while the outlet orifice 120 is still sealed, thus avoiding any risk of contamination of the "clean" side of the system. The assembly may be left in this position for a little while, allowing enough time for all the liquid to be evacuated. The time required for the evacuation of the liquid, depends on various system design parameters; it is an advantage of embodiments of the present invention that a relatively large drainage orifice can be provided, considerably reducing the time required for the draining, and hence, the total time of the servicing session. This is true in particular in system designs where the drainage channel provided by the filter element is the limiting factor for the drainage flow. Preferably, the time required to drain a filter element according to an embodiment of the present invention designed for use in heavy-duty equipment, is less than 15 minutes; more preferably, less than 10 minutes; and most preferably, less than 5 minutes.

If the counter-clockwise rotation of the cover 280 is continued, the filter element 200 will be pulled up further, causing disengagement of the sealing element 225 of the outlet tube 220 from the sealing zone 125 of the outlet orifice 120 (situation b in FIG. 10).

A final rotation will pull up the filter element 200 far enough to completely disengage the screw thread of the cover 290 from the screw thread of the base 100, such that the cover can be lifted vertically and the filter element 200 can be removed from the cover 290 for disposal or recycling (situation a in FIG. 10).

Thus, during removal, the seal 295 of the cover 290 disengages first, followed by the second sealing element 235, which allows the drainage to take place, and finally followed by the first sealing element 225 and its counterpart 226.

Figure 11:
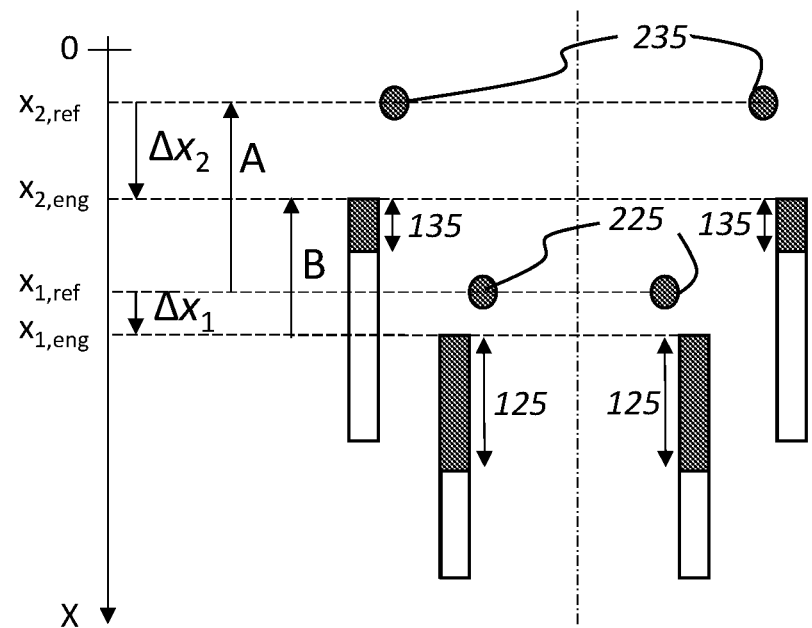
FIG. 11 illustrates the relationship between the axial distance between the first sealing element and the second sealing element, and the axial distance between a top end of the first sealing zone and a top end of the second sealing zone in an embodiment of the present invention.
Figure 12:
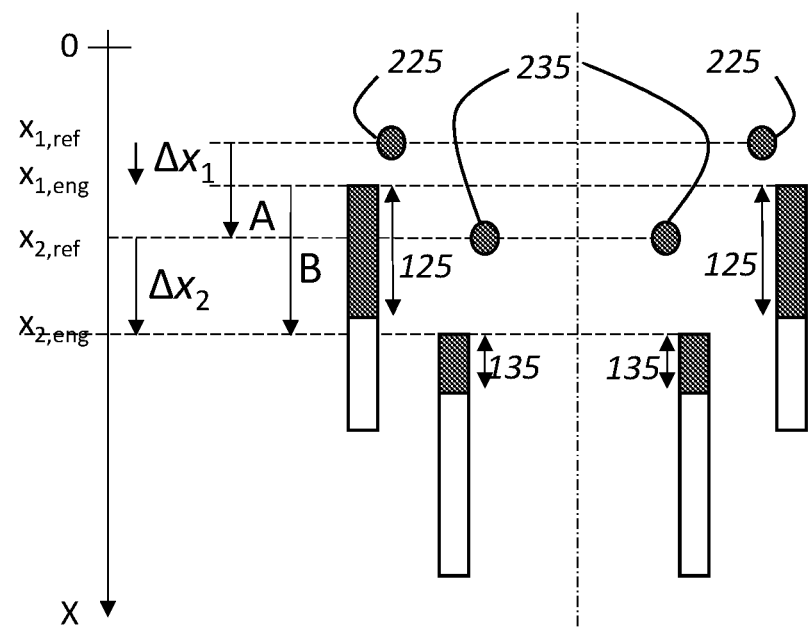
FIG. 12 illustrates the relationship between the axial distance between the first sealing element and the second sealing element and the axial distance between a top end of the first sealing zone and a top end of the second sealing zone in another embodiment of the present invention.

The relationship between the amounts of axial travel, the distances between the sealing elements, and the distances between corresponding ends of the sealing zones will now be clarified with reference to FIGS. 11 and 12. These Figures represent an arbitrary starting situation in which the sealing elements 225, 235 are at axial positions $x_{1,ref}$ and $x_{2,ref}$, respectively, as referenced to an X-axis directed downwards in the axial direction, where these sealing elements 225, 235 are not engaged with their respectively corresponding sealing zones 125, 135. The first sealing element 225 is separated from the top end of the first sealing zone 125, situated at axial position $x_{1,eng}$, by an axial distance $\Delta x_1 = x_{1,eng} - x_{1,ref}$. The second sealing element 235 is separated from the top end of the second sealing zone 135, situated at axial position $x_{2,eng}$, by an axial distance $\Delta x_2 = x_{2,eng} - x_{2,ref}$. The object of the present invention is met when the amount of axial travel $\Delta x_1$ required for the first sealing element 225 to engage with the first sealing zone 125 is smaller than an amount of axial travel $\Delta x_2$ required for the second sealing element 235 to engage with the second sealing zone 135:

$$\Delta x_1 < \Delta x_2 \qquad (\text{Eq. 1})$$

which can be expressed as follows by expanding the definitions:

$$x_{2,ref} - x_{1,ref} < x_{2,eng} - x_{1,eng} \qquad (\text{Eq. 2})$$

which can be expressed as follows by reordering the terms:

$$x_{1,eng} - x_{1,ref} < x_{2,eng} - x_{2,ref} \qquad (\text{Eq. 3})$$

FIG. 11 schematically illustrates the relationship between the axial distance $A = x_{2,ref} - x_{1,ref}$ between the first sealing element and the second sealing element, and the axial distance $B = x_{2,eng} - x_{1,eng}$ between a top end of the first sealing zone 125 facing the filter element and a top end of the second sealing zone 135 facing the filter element, in an embodiment of the present invention.

Accordingly, we have the following relations:

$$A = x_{2,ref} - x_{1,ref} \qquad (\text{Eq. 4})$$

$$B = x_{2,eng} - x_{1,eng} \qquad (\text{Eq. 5})$$

In the illustrated embodiment, the sealing arrangement of the drainage orifice (first sealing element 225 and first sealing zone 125) is positioned inside and below the sealing arrangement of the outlet orifice (second sealing element 235 and second sealing zone 135), as is also the case in the embodiments of FIG. 3-10. For the clarity of the representation alone, and without loss of generality, the sealing arrangement of the drainage orifice is not slanted in FIG. 12. It should be noted that, as a result of this arrangement and in view of the choice of the direction of the axis and the stated definitions, A and B are negative numbers.

It follows by simple substitution of (Eq. 4) and (Eq. 5) in (Eq. 3) that the following condition must be met:

$$A < B \qquad (\text{Eq. 6})$$

FIG. 12 schematically illustrates the relationship between the axial distance $A = x_{2,ref} - x_{1,ref}$ between the first sealing element and the second sealing element, and the axial distance $B = x_{2,eng} - x_{1,eng}$ between a top end of the first sealing zone 125 facing the filter element and a top end of the second sealing zone 135 facing the filter element, in another embodiment of the present invention. In the illustrated embodiment, the sealing arrangement of the drainage orifice (first sealing element 225 and first sealing zone 125) is positioned outside and above the sealing arrangement of the outlet orifice (second sealing element 235 and second sealing zone 135). For the clarity of the representation alone, and without loss of generality, the sealing arrangement of the drainage orifice is not slanted in FIG. 12. It should be noted that, as a result of this arrangement and in view of the choice of the direction of the axis and the stated definitions, A and B are now positive numbers.

As equations (Eq. 1)-(Eq. 5) remain valid, it again follows by simple substitution of (Eq. 4) and (Eq. 5) in (Eq. 3) that the following condition must be met:

$$A < B \qquad (\text{Eq. 6'})$$

The examples of FIG. 11 and FIG. 12 show that the objective of having, for any given starting position, an amount of axial travel $\Delta x_1$ required for the first sealing element 225 to engage with the first sealing zone 125 that is smaller than the amount of axial travel $\Delta x_2$ required for the second sealing element 235 to engage with the second sealing zone 135, can be met by an arrangement in which an axial distance A between the first sealing element 225 and the second sealing element 235 is smaller than an axial distance B between an end of the first sealing zone 125 facing the filter element 200 and an end of the second sealing zone 135 facing the filter element 200.

The present invention also pertains to a filter element for use in the filter assembly described above. The filter element 200 according to the invention comprises an outlet tube 220 with a first sealing element 225, and a drainage plug 230 with a second sealing element 235, the outlet tube 220 and the drainage plug 230 being concentric and positioned to sealingly engage with a first sealing zone 125 of an outlet orifice 120 and a second sealing zone 135 of a drainage orifice 130 of a base, respectively, when said base 100 receives a cover 290 containing at least partially said filter element 200. Further options and details of the filter element 200 are as described above in the context of the filter assembly.

While the description of the filter element 200 in the context of the filter assembly above uses terms such as "top", "bottom", "upper", and "lower", these terms refer to the orientation of the filter element 200 when mounted on an upright base 100, and should not be construed as absolute terms when the filter element 200 is regarded in isolation.

More generally, the present application also discloses a preferred filter element 200 comprising an outlet tube 220 with a first sealing element 225, and a drainage plug 230 with a second sealing element 235, the outlet tube 220 and the drainage plug 230 being concentric, and the outlet tube 220 optionally having a slanted end. The outlet tube 220 and the drainage plug 230 are positioned to sealingly engage with a first sealing zone 125 of an outlet orifice 120 and a second sealing zone 135 of a drainage orifice 130 of a base 100, respectively, and may have respective sealing means 225, 235 (e.g., a compressible ring such as an O-ring) for that purpose.

Figure 13:
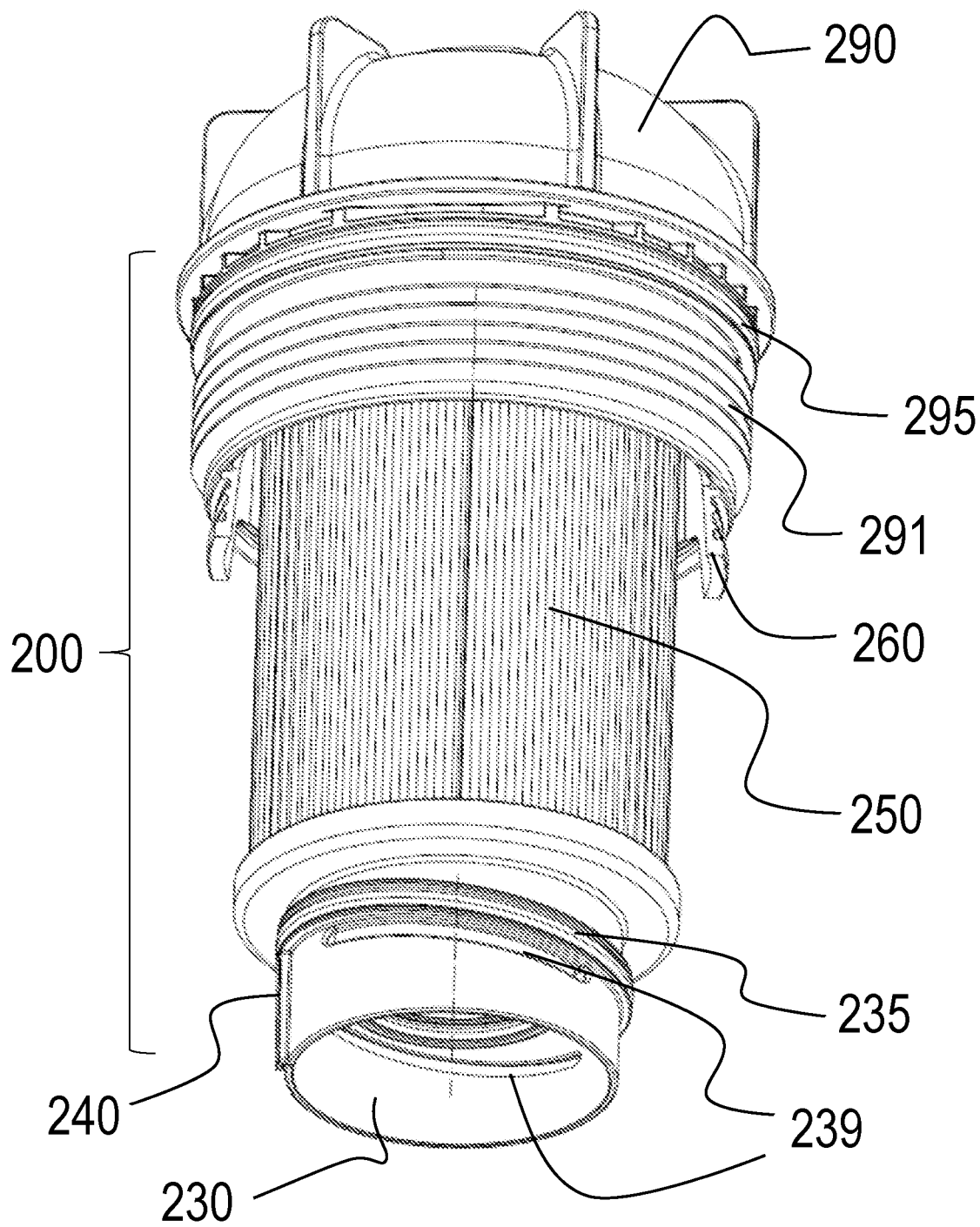
FIG. 13 presents a perspective drawing of a filter element according to an embodiment of the present invention, with a cover.

An embodiment of the filter element 200 according to the present invention is illustrated in FIG. 13. The filter element 200 is shown with the cover 290 installed on it. Latches 260 removably couple the cover to the filter element; the latches 260 are designed to catch onto an internal groove of the cover 290 during installation so as to fix the filter element to the cover. The filter element 200 can freely rotate along with the cover 290 until the protrusion 240 contacts the catching surface of the base (not shown). The filter element 200 comprises an outlet tube (not shown) and a drainage plug 230, with respectively a first sealing element (not shown) and a second sealing element 235, to provide the functions as described in detail hereinabove.

The drainage plug 230 is defined by a cylindrical mantle, the outlet tube and the drainage plug being concentric. The cylindrical mantle is provided with the second sealing element 235, which, in the illustrated case, is slanted at an angle relatively to a plane perpendicular to the filter element's longitudinal axis.

Considering designs that make use of a slanted seal to avoid installing the wrong type of filter element onto a base, it is an advantage of having the outer seal as the slanted seal, that the slanting angle may be reduced (relative to the situation where the inner seal is the slanted seal), while maintaining the same degree of protection against fitting the wrong type of filter. The angle may be determined as described above in the context of FIG. 8; the resulting angle may be less than 10°, preferably even less than 5°. Preferably the angle can be larger than 1°. It is a further advantage that it is easier to manufacture the filter element with the outer seal as the slanted seal. It is yet another advantage that the open lower end of the cylindrical mantle carrying the second sealing element 235 may be made to lie in a plane perpendicular to the filter element's longitudinal axis, with nothing protruding downwards from it, thus allowing the filter element 200 to stably rest in an upright position on a flat surface when it is not installed on a base—e.g., the filter element 200 may safely be placed on a table or a workbench upon removal from the base during servicing.

The protrusion 240 may be an axial rib, radially protruding from the cylindrical mantle, oriented along a direction parallel to the filter element's longitudinal axis. Preferably, the rib protrudes no further than the radial extent of the second sealing element 235. The axial rib may be hollow (a local displacement of the cylinder mantle, without substantively increasing the local thickness of the material), or solid. While the Figure illustrates a relatively narrow axial rib, the axial rib may have a more substantial angular extent.

A slot-shaped opening 239 is provided in the lower cylindrical mantle of the filter element 200, which facilitates and accelerates the drainage process.

Independently of, but not excluding, other features described herein, the present disclosure also pertains to a filter element 200 comprising an outlet tube and a drainage plug 230 defined by a cylindrical mantle, the outlet tube 220 and the drainage plug 230 being concentric, wherein the cylindrical mantle is provided with at least one through opening 239 arranged to allow the passage of fluids to be drained when the filter element 200 is brought in a position in which fluid from a base 100 is allowed to be drained.

Independently of, but not excluding, other features described herein, the present disclosure also pertains to a filter element 200 comprising an outlet tube and a drainage plug 230 defined by a cylindrical mantle, the outlet tube 220 and the drainage plug 230 being concentric, wherein the cylindrical mantle is provided with an axial rib, radially protruding from the cylindrical mantle, oriented along a direction parallel to the filter element's longitudinal axis. Preferably, the cylindrical mantle is provided with an optionally slanted outwardly protruding sealing element 235 (e.g. an O-ring in a groove), the rib protruding no further than the radial extent of said sealing element 235.

While the invention has been described hereinabove with reference to specific embodiments, this is done to clarify and not to limit the invention, the scope of which is determined by the accompanying claims.

The invention claimed is:

1. A filter element including a filter medium; the filter element comprising an outlet tube positioned to extend away from the filter medium and in axial alignment with at least a portion of the filter medium; the outlet tube having a first groove holding a first O-ring sealing element; the filter element having a drainage plug with a second groove holding a second O-ring sealing element, the outlet tube and the drainage plug being concentric, the drainage plug having a length measured from an end of the filter element along one location longer than a length of the outlet tube measured from the end of the filter element; wherein the outlet tube and the drainage plug are positioned to sealingly engage with a first sealing zone of an outlet orifice and a second sealing zone of a drainage orifice of a base, respectively, at different consecutive stages of a filter element installation process;

wherein an uppermost portion of said second O-ring sealing element is arranged in a plane slanted at an angle relative to a plane perpendicular to a longitudinal axis of the filter element; and said drainage plug comprises a cylindrical surface having at least one opening through a portion of the cylindrical surface to facilitate drainage.

2. The filter element according to claim 1, wherein the first O-ring sealing element and the second O-ring sealing element are positioned at different axial distances from an axial extremity of said filter element.

3. The filter element according to claim 1 wherein the at least one opening is slot-shaped.

4. The filter element according to claim 1 further comprising a protrusion radially protruding from said cylindrical surface.

5. The filter element according to claim 4 wherein the protrusion is oriented along a direction parallel to the longitudinal axis of said filter element.

6. The filter element according to claim 4 wherein the protrusion comprises an axial rib.

7. The filter element according to claim 1 wherein said angle is larger than 1°.

8. The filter element according to claim 1 wherein said angle is less than 10°.

9. A filter element comprising:
(a) an outlet tube with a first sealing element;
(b) a drainage plug with a second sealing element;
   (i) the outlet tube and the drainage plug being concentric;
   (ii) the outlet tube and the drainage plug being positioned to sealingly engage with a first sealing zone of an outlet orifice and a second sealing zone of a drainage orifice of a base, respectively, at different consecutive stages of a filter element installation process; and
(c) said drainage plug having a cylindrical surface with at least one opening through the cylindrical surface to facilitate drainage.

10. The filter element of claim 9 wherein the first sealing element and the second sealing element are positioned at different axial distances from an axial extremity of said filter element.

11. The filter element of claim 9 further comprising a protrusion radially protruding from said cylindrical surface.

12. The filter element of claim 11 wherein the protrusion is oriented along a direction parallel to the longitudinal axis of said filter element.

13. The filter element of claim 11 wherein the protrusion comprises an axial rib.

14. The filter element of claim 9 wherein an uppermost portion of at least one of said first sealing element or said second sealing element is arranged in a plane slanted at an angle larger than 1°, the angle being relative to a plane perpendicular to a longitudinal axis of the filter element.

15. The filter element of claim 9 wherein an uppermost portion of said second sealing element is arranged in a plane slanted at an angle relative to a plane perpendicular to a longitudinal axis of the filter element.

16. The filter element according to claim 15 wherein said angle is larger than 1°.

* * * * *